March 30, 1926.
C. A. SIMS
SIDE LAMP FOR AUTOMOBILES
Filed June 30, 1924
1,578,772
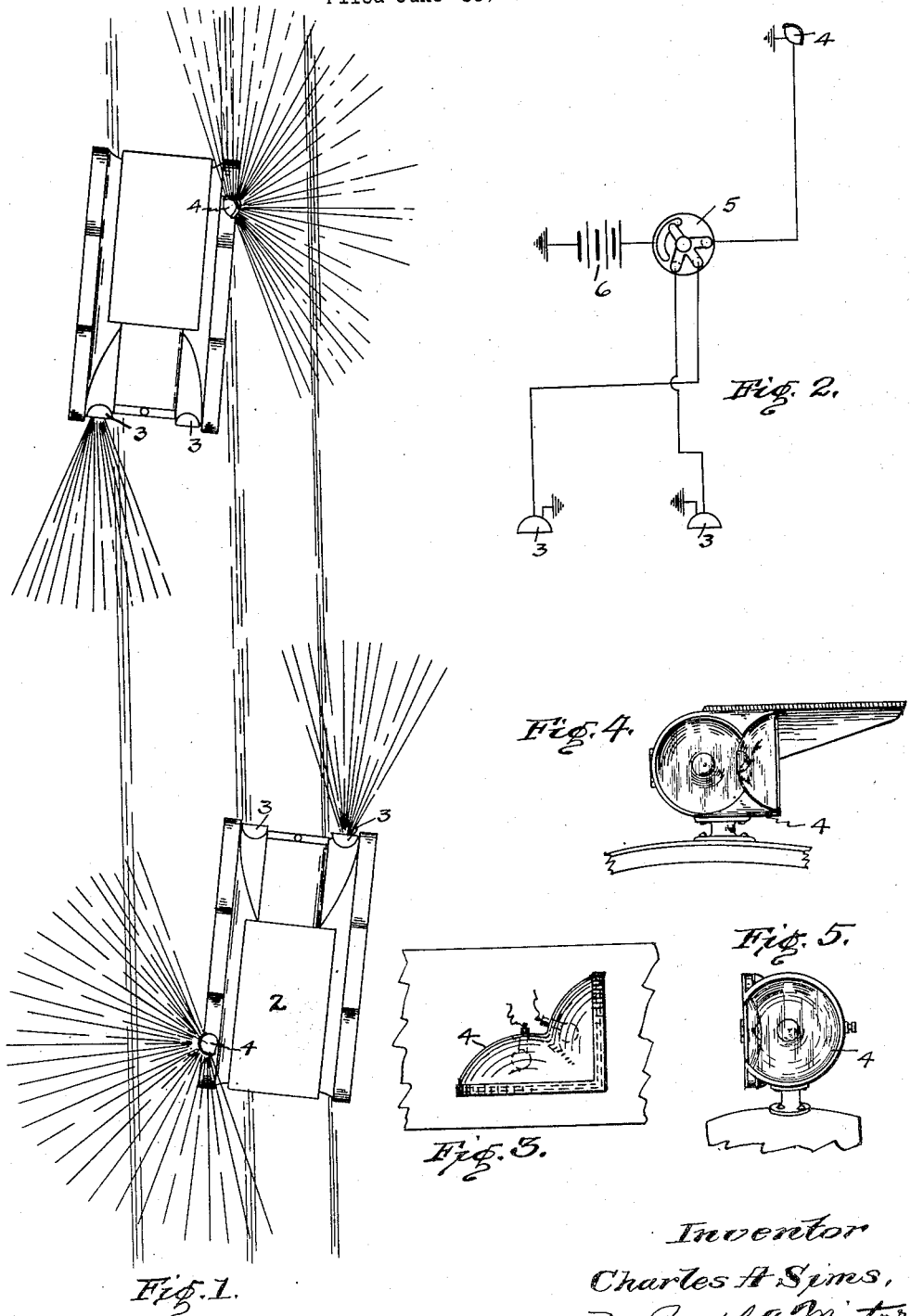

Patented Mar. 30, 1926.

1,578,772

UNITED STATES PATENT OFFICE.

CHARLES A. SIMS, OF ODON, INDIANA.

SIDE LAMP FOR AUTOMOBILES.

Application filed June 30, 1924. Serial No. 723,189.

*To all whom it may concern:*

Be it known that I, CHARLES A. SIMS, a citizen of the United States, residing at Odon, in the county of Daviess and State of Indiana, have invented new and useful Improvements in Side Lamps for Automobiles, of which the following is a specification.

I am aware that tail-lights are in common use in motor cars of sufficient brilliancy to illuminate a colored light as a danger signal to keep vehicles approaching from the rear from running into the one carrying the tail-light, also, to illuminate a license plate, and that small signal lamps have been mounted on the rear fenders of a car, and I am also aware that lamps have been provided to illuminate the vicinity of a side door for those entering or leaving a car bearing the lamp, but in none of these is the lamp capable of lighting the roadway to the side and rear of the car bearing the lamp for the guidance of a passing vehicle.

As is well known the glare of automobile headlights is extremely confusing to the drivers of passing cars. and even when dimmed the shutting off of the brilliant lights leaves the eyes in such a partially blinded condition that the surrounding darkness is quite impenetrable and the cars pass each other without either driver being able to see the road ahead of them.

The object of my invention is to turn out the headlights and simultaneously and automatically switch on lights on the side where the opposite car passes that will fully illuminate the road not only at the side of the car being passed, but far enough to the rear of it to disclose another car behind, a bridge, or turn in the road, or in other words, to fully disclose the road-way and any dangers that may exist, for the car about to pass over it. So far as I know this was never done before I did it.

I accomplish the above and other minor objects that will hereinafter appear, by the means more or less diagrammatically illustrated in the accompanying drawing, in which—

Fig. 1 is a diagram in top plan view of two automobiles passing each other and both equipped with my invention; Fig. 2 is a diagram in which the wiring of the lamps for control at a switch on the instrument board of the car by a multiple switch is shown in one form or arrangement thereof; Fig. 3 is a view in horizontal top plan view of a side lamp adapted to illuminate at the side and rear of the car; Fig. 4 is a side elevation of the lamp showing a fragment of a visor used when the lamp is mounted near the front of the car such that the visor will prevent the light from striking the driver within, and Fig. 5 is a rear elevation of the same with the visor entirely removed.

Additional lamps 4 are located on the rear car fender where the light will illuminate the road at the side and rear of the car. I have here shown it as located on the rear fender, which I regard as the most suitable place to obtain support and also effective illumination of the roadway in all directions, and particularly to the side and rear of the car. There may be a group of separate lamps with appropriate reflectors, or, and as here shown, a double bulb lamp with appropriately designed reflectors may be employed, at a saving in current to operate it, and for the simplifying of the wiring and the switch mechanism.

In the lamp 4 as here shown, there are two reflectors joined at their intersections, and throwing the light practically in an arc of 180°, so the roadway to the side and well toward the front of the car, and thence on to the rear and clear back of the car and across the road, will be so brilliantly illuminated that the driver of the passing car can readily see the roadway to the side and rear of the car he is passing. The entire roadway to the rear of the car bearing my improvements is fully lit up for 300 feet or more. Location of the lamp 4, at the top of the rear fender, is quite important for the best results.

I prefer to leave the right hand front light on where the passing car is not equipped with my invention, so the equipped car driver may see to pass it. But where all cars are equipped with my device, both headlights will be entirely switched off.

The rear illumination is of great advantage when the driver desires to back his car.

All of the lamps are appropriately wired to a switch 5, so designed that a single lamp, or two or more lamps in any selective grouping, at the will of the driver of the car, may be made. The switch bears appropriate legends (not shown) to instruct the driver in connecting the lamps. The wiring diagram, Fig. 2, shows a battery 6 as a source of current. As the switch stands in the diagram, contacts are made so as to cause both headlights 3, and the rear light 4, on the left of the car, to be illuminated. By turning the switch anti-clockwise the left headlight 3, of a car is first turned off; then, by further movement of the switch in the same direction the right hand light in front is extinguished, and a still further movement turns off the rear light on the side.

All of the above parts may be modified in a manner known to those skilled in the arts to which they belong, without departing from the spirit of this invention.

Having thus fully described my invention and the manner of its use, what I claim as new and wish to secure by Letters Patent is,—

1. A side lamp for an automobile comprising two projecting reflectors, with their axes at an angle to each other, the reflectors intersecting each other in a central curved line, independent sources of light substantially at the foci of the reflectors.

2. A side lamp for an automobile comprising two projecting reflectors, with their axes at an ang'e to each other, the reflectors intersecting each other in a central curved line, independent sources of light substantially at the foci of the reflectors, said lamp mounted to direct the light from one reflector to the rear, and that from the other to the side of the automobile.

Signed at Odon, county of Daviess, State of Indiana, this the 24th day of June 1924.

CHARLES A. SIMS.